3,431,262
PYRAZOLO QUINOXALINES
Gerhard R. Wendt, Havertown, and Kurt W. Ledig, Philadelphia, Pa., assignors to American Home Products Corporation, New York, N.Y., a corporation of Delaware
No Drawing. Filed Mar. 26, 1968, Ser. No. 715,983
U.S. Cl. 260—250      2 Claims
Int. Cl. C07d *51/78, 57/24*

---

ABSTRACT OF THE DISCLOSURE 6,7-dihydroxy-1H-pyrazolo-[3,4-b] - quinoxaline - 5,8-diones, optionally substituted in the 1-position with alkyl or aryl and in the 3-position with hydroxyl, alkyl or pyridyl (I) and their salts are prepared by condensing 3,4-diaminopyrazole (II) with rhodizonic acid (III) and, if desired, forming a salt of the product. Compounds I are pharmacologically active, especially as anti-inflammatory agents and as diuretic agents.

---

This invention relates to quinoxaline derivatives and more particularly to substituted pyrazolo-[3,4-b]-quinoxalines showing pharmacological activity, and with a method for their preparation.

Description of the invention

The compounds contemplated by this invention are those of Formula I:

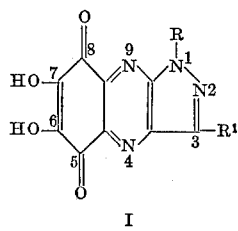

I wherein R is hydrogen, (lower)alkyl or phenyl; and $R^1$ is hydrogen, hydroxyl, (lower)alkyl or pyridyl; or a non-toxic, pharmaceutically-acceptable salt of said compound with a base.

Special mention is made of a valuable embodiment of this invention which is the compound 3,6,7-tri-hydroxy-1H-pyrazolo-[3,4-b]-quinoxaline-5,8-dione, a compound of Formula I wherein R is hydrogen and $R^1$ is hydroxyl.

When used herein and in the appended claims, the term "(lower)alkyl" contemplates hydrocarbon radicals, straight and branched chain, containing from about 1 to about 6 carbon atoms, illustrative members of which are methyl, ethyl, n-propyl, i-propyl, n-butyl, t-butyl, n-pentyl, n-hexyl and the like. R can also be any aryl or a heterocyclic group; however, generally, hydrogen is preferred.

The compounds of Formula I of this invention and their salts have demonstrated pharmacological activity. In particular they have been found to have anti-inflammatory action when tested under standard and accepted pharmacological procedures in animals, such as mice and rats. Also in particular they have been found to have diuretic action when tested under standard and accepted pharmacological procedures in animals, such as mice and rats. They are, therefore, deemed to possess utility in experimental and comparative pharmacology and are of value to treat conditions in animals, such as valuable domestic animals, such as horses, dogs and cats, and in laboratory animals, such as mice, rats and the like, responsive to treatment with anti-inflammatory agents, such as inflammations, and with diuretics, such as edemae.

The compounds of Formula I are prepared by reacting a pyrazole (II) or a salt thereof, such as the sulfate, with rhodizonic acid (III) or a salt thereof, such as the dipotassium salt, in the presence of an acid, such as a mineral acid, for example, sulfuric acid, in accordance with the following reaction scheme.

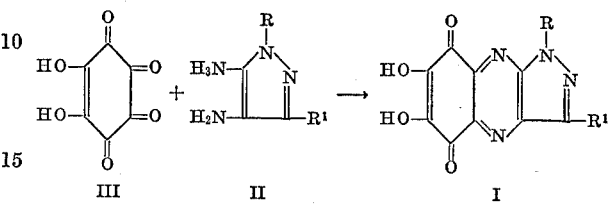

wherein R and $R^1$ are as defined hereinabove. In one convenient manner of proceeding, the compound of Formula II is suspended in about 10 parts by weight of 2 N sulfuric acid and to this is added the stoichiometrical amount (an excess will do) of rhodizonic acid dipotassium salt dissolved in about 15 parts by weight of 2 N sulfuric acid. The reaction takes place smoothly at moderate temperatures, e.g., from about 10° C. to about 75° C. and preferably at about 22° C., where it is substantially complete in about 4 hours. The product usually precipitates from the reaction mixture from which it can be recovered, for example, by filtration.

Since most of the compounds of Formula I of this invention are acidic (by virtue of the hydroxyl groups) advantage may be taken of the water solubility of salts of these compounds formed with bases in the isolation and/or purification of the instant compounds and in the preparation of aqueous solutions of the new compounds for parenteral administration. Suitable bases for forming the instant pharmaceutically-acceptable non-toxic salts are alkali metal hydroxides, carbonates, bicarbonates and the like, such as sodium hydroxide, sodium carbonate, sodium bicarbonate, potassium hydroxide, lithium hydroxide, and the like and amines, such as ammonia and non-toxic primary, secondary and tertiary aliphatic and aromatic amines containing from about 1 to about 7 carbon atoms, e.g., methylamine, ethylamine, n-hexyl amine, benzylamine, and the like. The salts can be prepared by commonly used techniques, for example, by reacting the compound of Formula I with a stoichiometrical amount of the desired base in aqueous suspension, alcoholic solution, acetone and the like, then concentrating the solution.

Reactants of Formulae II and III are known compounds many of which are available from commercial sources. Others which are not commercially available can easily be prepared in accordance with standard procedures well known to those skilled in the art. For example, 3,4-diaminopyrazole is shown in Ann. 707, 141 (1967); 4,5-diamino-3-methylpyrazole is shown in Gazz. Chim. Ital., 73, 355 (1943); 4,5-diamino-3-methyl-1-phenylpyrazole is also shown in Gazz. Chim. Ital., loc cit.; 4,5-diamino-3-hydroxy-1-methylpyrazole is shown in J. Am. Chem. Soc. 78, 5451 (1956); and 4,5-diamino-3-hydroxy-1-phenylpyrazole is shown in J. Am. Chem. Soc. 80, 421 (1958); 4,5-diamino-3-(3-pyridyl)pyrazole is shown in J. Chem. Soc., 418 (1935).

The compounds of Formula I of this invention and their salts may be administered either alone or in combination with other pharmacologically-active ingredients. Whether singly or in combination, they may be used in the form of solid compositions for oral administration combined, if desired, with extenders or carriers that are relatively non-toxic or inert. They may be put into tablet, capsule or powder form. On the other hand, they may be administered in liquid form as a suspension or solution in a suitable vehicle for parenteral use. By way of illustration, pharmacological action as anti-inflammatory agents in rats has been demonstrated when a compound of this invention is administered at dosages of 50 mg./kg., i.p., and 100 mg./kg., p.o. By way of illustration, pharmacological action as a diuretic agent in rats has been demonstrated when a compound of this invention is administered i.p. at a dosage of 10 mg./kg.

Description of the preferred embodiments

The following examples are given by way of illustration and are not to be construed as limitations of this invention, many variations of which are possible without departing from the spirit and scope thereof.

Example 1.—3,6,7-trihydroxy-1H-pyrazolo-[3,4-b]-quinoxaline-5,8-dione

To a suspension of 2.5 g. of 3,4-diamino-5-hydroxypyrazole sulfate in 25 ml. of 2 N sulfuric acid is added a solution of 3.4 g. of rhodizonic acid dipotassium salt in 50 ml. of 2 N sulfuric acid. The reaction mixture is stirred for 4 hours at about 22° C., and the resulting precipitate is filtered, washed with water and dried. There is obtained 1.5 g. of the product base, as the dihydrate, M.P.,>300°C.

Analysis.—Calcd. for $C_9H_4N_4O_5 \cdot 2H_2O$: C, 38.03; H, 2.84; N, 19.72; $H_2O$, 12.7. Found: C, 37.83; H, 3.06; N, 20.42; $H_2O$, 10.75.

The base is converted to the sodium salt by dissolving the base in a stoichiometrical amount of aqueous sodium bicarbonate and evaporating the mixture to dryness to leave the salt as a residue. In the same manner are prepared the corresponding potassium and lithium salts. Treatment of the base in isopropanol solution with a methanolic solution of the corresponding amine provides the ammonium, methylammonium, ethylammonium, n-hexylammonium and benzylammonium salts after evaporation of the solvents.

Example 2.—6,7-dihydroxy-1H-pyrazolo-[3,4-b]-quinoxaline-5,8-dione

The procedure of Example 1 is repeated substituting for the 3,4-diamino-5-hydroxypyrazole a stoichiometrical amount of 3,4-diaminopyrazole and the product is obtained.

Example 3.—6,7-dihydroxy-1H-pyrazolo-[3,4-b]-quinoxaline-5,8-dione

The procedure of Example 1 is repeated substituting for the 3,4-diamino-5-hydroxypyrazole a stoichiometrical amount of 4,5-diamino-3-methyl pyrazole and the product is obtained.

Example 4.—6,7-dihydroxy-3-methyl-1-phenyl-1H-pyrazolo-[3,4-b]-quinoxaline-5,8-dione The procedure of Example 1 is repeated substituting for the 3,4-diamino-5-hydroxypyrazole a stoichiometrical amount of 4,5-diamino-3-methyl-1-phenylpyrazole and the product is obtained.

Example 5.—3,6,7-trihydroxy-1-methyl-1H-pyrazolo[3,4-b]-quinoxaline-5,8-dione

The procedure of Example 1 is repeated substituting for the 3,4-diamino-5-hydroxypyrazole a stoichiometrical amount of 4,5-diamino-3-hydroxy-1-methylpyrazole and the product is obtained.

Example 6.—3,6,7-trihydroxy-1-phenyl-1H-pyrazolo-[3,4-b]-quinoxaline-5,8-dione

The procedure of Example 1 is repeated substituting for the 3,4-diamino-5-hydroxypyrazole, stoichiometrical amount of 4,5-diamino-3-hydroxy-1-phenylpyrazole and the product is obtained.

Example 7

The procedure of Example 1 is repeated substituting for the 3,4-diamino-5-hydroxyprazole, stoichiometrical amounts of the following pyrazoles:

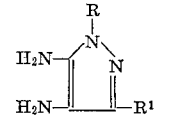

| R | R¹ |
|---|---|
| $CH_3$ | H |
| $C_6H_5$ | H |
| $CH_3$ | $CH_3$ |
| H |  |

There are obtained the following pyrazolo quinoxalines:

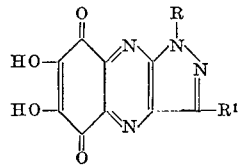

| R | R¹ |
|---|---|
| $CH_3$ | H |
| $C_6H_5$ | H |
| $CH_3$ | $CH_3$ |
| H |  |

The procedure of Example 1 is used to convert the above pyrazolo quinoxalines and those of Examples 2 to 6 into the corresponding sodium, potassium lithium, ammonium, methylammonium, ethylammonium, n-hexylammonium and benzylammonium salts.

In evaluating the instant compounds for pharmacological activity, they are tested in vivo by standard methods with the following results.

A five-hour diuretic assay is made in rats by a modification of the procedure of W. L. Lipschitz, Z. Hadidian and A. Kerpczar, J. Pharmacol, 79, 97 (1943). Male Sprague-Dawley rats 14 to 17 weeks old, 175–200 g., are used. At 4 p.m. on the day before an experiment, food and water are removed. On the next morning, the compound is administered p.o. or i.p. in saline. Each compound is given to 5 rats, urea at a dose of 960 mg./kg. is given as a standard and saline alone is given as a control. The animals are placed in metabolism cages, 2 rats per cage, and urine is collected for 5 hours. Volume, sodium and potassium are determined by standard techniques. Compounds having a ratio of greater than 1.00 for volume and 1.00 for sodium are considered active.

In this test, 3,6,7-trihydroxy-1H-pyrazolo-[3,4-b]-quinoxaline-5,8-dione, at 10 mg./kg., i.p., had a sodium ratio of 1.70 and a volume ratio of 1.66 and was observed to be active.

In a standard test for anti-inflammatory activity in rats, derived from Winter et al., Proc. Soc. Exp. Biol. and Med., 111, 544 (1962) and Buttle et al., Nature, 179, 629 (1957), the ability of the compound to inhibit experimentally-induced edema in the hind paw of the animal is assayed. Male Sprague-Dawley rats, 120–165 grams, are used. The compound is administered intraperitoneally (i.p.) as a solution or suspension in physiological saline (plus 1 drop of emulsifier) in a volume of 10 ml./kg. Each compound is given to 5 rats and vehicle alone is administered to 5 more rats as a control. Thirty minutes after drug administration, edema is induced by an injection of 0.05 ml. of a 1% carrageenin solution into the subplantar tissue of the rat's right hind paw. Paw volume is then immediately measured volumetrically with a plethysmograph and again 3 hours later. The mean volume of swelling for the control group is calculated and compared to the test groups. Compounds that inhibit swelling approximately 20% as compared to controls are considered active. Inhibition is calculated by the formula:

$$\text{Percent inhibition} = \frac{\text{mean vol. swelling of control} - \text{mean vol. swelling of test}}{\text{mean vol. swelling of control}} \times 100$$

Promising compounds are tested orally by a similar procedure.

In this test, 3,6,7-trihydroxy-1H-pyrazolo-[3,4-b]-quinoxaline-5,8-dione at 50 mg./kg., i.p., caused 49% inhibition and was active; and at 100 mg./kg., p.o., caused 29% inhibition and was active.

We claim:
1. A compound of the formula:

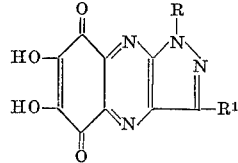

wherein R is hydrogen, (lower)alkyl or phenyl; and
$R^1$ is hydrogen, hydroxyl, (lower)alkyl or pyridyl; or a non-toxic, pharmaceutically-acceptable salt of said compound with a base.

2. A compound as defined in claim 1 which is 3,6,7-trihydroxy-1H-pyrazolo-[3,4-b]-quinoxaline-5,8-dione.

References Cited

Schipper et al.: Journal Amer. Chem. Soc., vol. 73, pp. 5672–5675 (1951).

NICHOLAS S. RIZZO, *Primary Examiner.*

U.S. Cl. X.R.

424—250